US006320823B1

(12) United States Patent
Miyashita et al.

(10) Patent No.: US 6,320,823 B1
(45) Date of Patent: Nov. 20, 2001

(54) METHOD OF AND APPARATUS FOR PROCESSING DATA TRANSMITTED THROUGH A COMMUNICATION LINE

(75) Inventors: Masahiko Miyashita; Takao Yamada; Kazuo Kamei, all of Saitama-ken; Sanpei Asai; Makoto Takanashi, both of Tokyo, all of (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/326,636

(22) Filed: Jun. 7, 1999

(30) Foreign Application Priority Data

Jun. 10, 1998 (JP) ........................................... 10-162662

(51) Int. Cl.[7] ........................................... G11B 17/22

(52) U.S. Cl. ......................... 369/30; 434/307 A; 84/609; 707/203

(58) Field of Search ............................ 369/32, 30, 59, 369/275.3, 178, 192; 434/307 A, 307 R, 118; 84/609, 601, 645, 644; 707/203, 201

(56) References Cited

U.S. PATENT DOCUMENTS 5,127,303 * 7/1992 Tsumura et al. ........................ 84/609
5,833,469 * 11/1998 Ito et al. .......................... 434/307 A
5,848,422 * 12/1998 Sato et al. ............................ 707/203

* cited by examiner

*Primary Examiner*—Ali Neyzari
(74) *Attorney, Agent, or Firm*—Arent Fox Kintner Plotkin & Kahn, PLLC

(57) ABSTRACT

A method of and an apparatus for processing communication data transmitted from a data center such as a sing-along data center to a terminal communication apparatus such as a communication type sing-along apparatus via a communication line. The method and apparatus are such that a data file may be stored in a first memory provided in the terminal communication apparatus when said data file has been transmitted from the data center while the terminal communication apparatus itself is not in operation, a version of the data file stored in the first memory is compared with a version of an existing data file formerly recorded in a second memory provided in the terminal communication apparatus when said terminal communication apparatus is in operation and said second memory is in ON state, the data file formerly recorded in the second memory is replaced by the data file recorded in the first memory if it is determined that the version of the data file recorded in the second memory is older than the version of the data file recorded in the first memory.

10 Claims, 3 Drawing Sheets

METHOD OF AND APPARATUS FOR PROCESSING DATA TRANSMITTED THROUGH A COMMUNICATION LINE

BACKGROUND OF THE INVENTION

The present invention relates to a method of and an apparatus for processing communication data, particularly to a method of and an apparatus for processing communication data transmitted via a data communication line.

There have been known various data communication systems capable of transmitting a data file via a data communication line such as a telephone line. One kind of data communication system includes a communication type sing-along apparatus.

A communication type sing-along apparatus is usually adapted to down-load various music data and background picture data via a telephone line from a host computer in a sing-along data center. With the use of such a communication type sing along apparatus, it is allowed to obtain a large amount of music data and background picture data continuously accumulated in the sing-along data center, thereby making it possible to easily meet with customer's requests for singing new songs.

In practice, the music data transmitted from the sing-along data center is stored in a hard disc drive contained in the communication type sing-along apparatus. Meanwhile, a large amount of music data that fail to be stored in the hard disc drive are stored in CD-ROMs stocked in the same sing along apparatus so that said music data may be properly managed.

In fact, the CD-ROMs storing the music data are stocked together with DVDs storing the background picture data. In detail, both the CD-ROMs and the DVDs are stocked in a disc changer which is one part of the communication type sing-along apparatus.

In more detail, the disc changer of the communication type sing-along apparatus is adapted to pickup, from the stocked CD-ROMs and DVDs, a desired CD-ROM storing music data required by a specific request and a desired DVD storing corresponding background picture data to be displayed on a monitor, so as to meet a customer's request for singing a song corresponding to the requested music data. Meanwhile, such disc changer is capable of reading the music data and the corresponding background picture data from the selected CD-ROM and DVD so as to effect a predetermined data reproduction.

Generally, said disc changer of the communication type sing-along apparatus requires the use of an application software in order to perform the desired operation thereof. Further, such application software is often needed to be renewed in order to incorporate some new improvements or some newly developed functions, thereby requiring a version-up treatment. For this reason, a data file for version-up is transmitted via a telephone line from the sing-along data center, while an old application software stored in the disc changer is replaced by the new version of the application soft wear.

However, there is a problem with a communication type sing-along apparatus formed according to a prior art. Namely, if a data file for version-up is transmitted to the sing-along apparatus from a sing-along data center when the disc changer is in an electrically OFF state, it is impossible for the transmitted data file to be downloaded into the disc changer.

For example, with a communication type sing-along apparatus for business use, a disc changer is usually disconnected from an electric power source when not in business time. Further, since a data file for version-up is often transmitted from the sing-along data center during a time period when the sing-along apparatus is not in business use, it is required that the disc changer be constantly in an electrically ON state, thereby ensuring that a transmitted data file can be downloaded into the disc changer at any time.

In addition, a disc changer of a communication type sing-along apparatus might have to be replaced by a new one for the purpose of maintenance. Accordingly, an application software of the new disc changer will also have to be replaced by a new version. If such a replacement of application software fails to be completed in time, the communication type sing-along apparatus will fail to provide desired operations obtainable by the new version of an application software, hence bringing about a deterioration in the quality of a sing-along service.

SUMMARY OF THE INVENTION

It is an object of the present invention to provide an improved method and apparatus for processing communication data, which is capable of exactly renewing a data file stored in a communication type sing-along apparatus by receiving a new data file from a sing-along data center via a communication line.

It is another object of the present invention to provide an improved method and apparatus for processing communication data, which is capable of exactly renewing a data file stored in a communication type sing-along apparatus, also capable of exactly transmitting information on the quality of the operation of the sing-along apparatus to a sing-along data center.

According to the present invention, there is provided a method of processing communication data transmitted from a data center such as a sing-along data center to a terminal communication apparatus such as a communication type sing-along apparatus via a communication line, said method comprising: storing a data file in a first memory means provided in the terminal communication apparatus when said data file has been transmitted from the data center while the terminal communication apparatus itself is not in operation; comparing a version of the data file stored in the first memory means with a version of an existing data file formerly recorded in a second memory means provided in the terminal communication apparatus when said terminal communication apparatus is in operation and said second memory means is in ON state; replacing the data file formerly recorded in the second memory means with the data file recorded in the first memory means if it is determined that the version of the data file recorded in the second memory means is older than the version of the data file recorded in the first memory means.

In one aspect of the present invention, the data file recorded in the first memory means is not erased even after the data file formerly recorded in the second memory means is replaced by the data file recorded in the first memory means.

In another aspect of the present invention, quality data indicating an operation quality of the terminal communication apparatus is recorded on a third memory means which is in OFF state when said terminal communication apparatus is not in operation, the quality data recorded on the third memory means is then stored in a fourth memory means before the third memory means is turned OFF.

In a further aspect of the present invention, when a data file is transmitted from the data center to the terminal communication apparatus, the quality data stored in the fourth memory means is transmitted to the data center via the communication line.

In a still further aspect of the present invention, said terminal communication apparatus includes a controller having said first memory means and a disc changer having said second memory means. When the disc changer is in OFF state and a data file for use in the disc changer is transmitted from the data center to the terminal communication apparatus, the transmitted data file is at first stored in the first memory means provided within the controller.

Further, according to the present invention, there is provided an apparatus such as a communication type sing-along apparatus capable of processing communication data transmitted from a data center such as a sing-along data center via a communication line, said apparatus comprising: a first memory means for storing a data file transmitted from the data center when said apparatus is not in its operation; a second memory means which is turned OFF when said apparatus is not in its operation; a comparator means for comparing a version of the data file stored in the first memory means with a version of an existing data file formerly recorded in the second memory means when the second memory means is in ON state; a controller means for replacing the data file formerly recorded in the second memory means with the data file recorded in the first memory means if it is determined by the comparator means that the version of the data file recorded in the second memory means is older than the version of the data file recorded in the first memory means.

In one more aspect of the present invention, said apparatus further comprises: a third memory means which is adapted to record quality data indicating an operation quality of said apparatus and is turned OFF when said apparatus is not in its operation; a fourth memory means which is adapted to receive and store the quality data fed from the third memory means. In particular, the controller means is adapted to operate such that when said apparatus is in its operation, the quality data recorded on the third memory means is fed to and stored in the fourth memory means before the third memory means is turned OFF, and that when a data file is transmitted from the data center to said apparatus, the quality data stored in the fourth memory means is transmitted to the data center via the communication line.

In still one more aspect of the present invention, said apparatus includes a controller having said first memory means and a disc changer having said second memory means. In particular, said controller means operates such that when the disc changer is in OFF state and a data file for use in the disc changer is transmitted from the data center to said apparatus, the transmitted data file is at first stored in the first memory means provided within the controller.

The above objects and features of the present invention will become better understood from the following description with reference to the accompanying drawings.

DETAILED DESCRIPTION OF THE PREFERRED EMBODIMENTS

Figure 1:
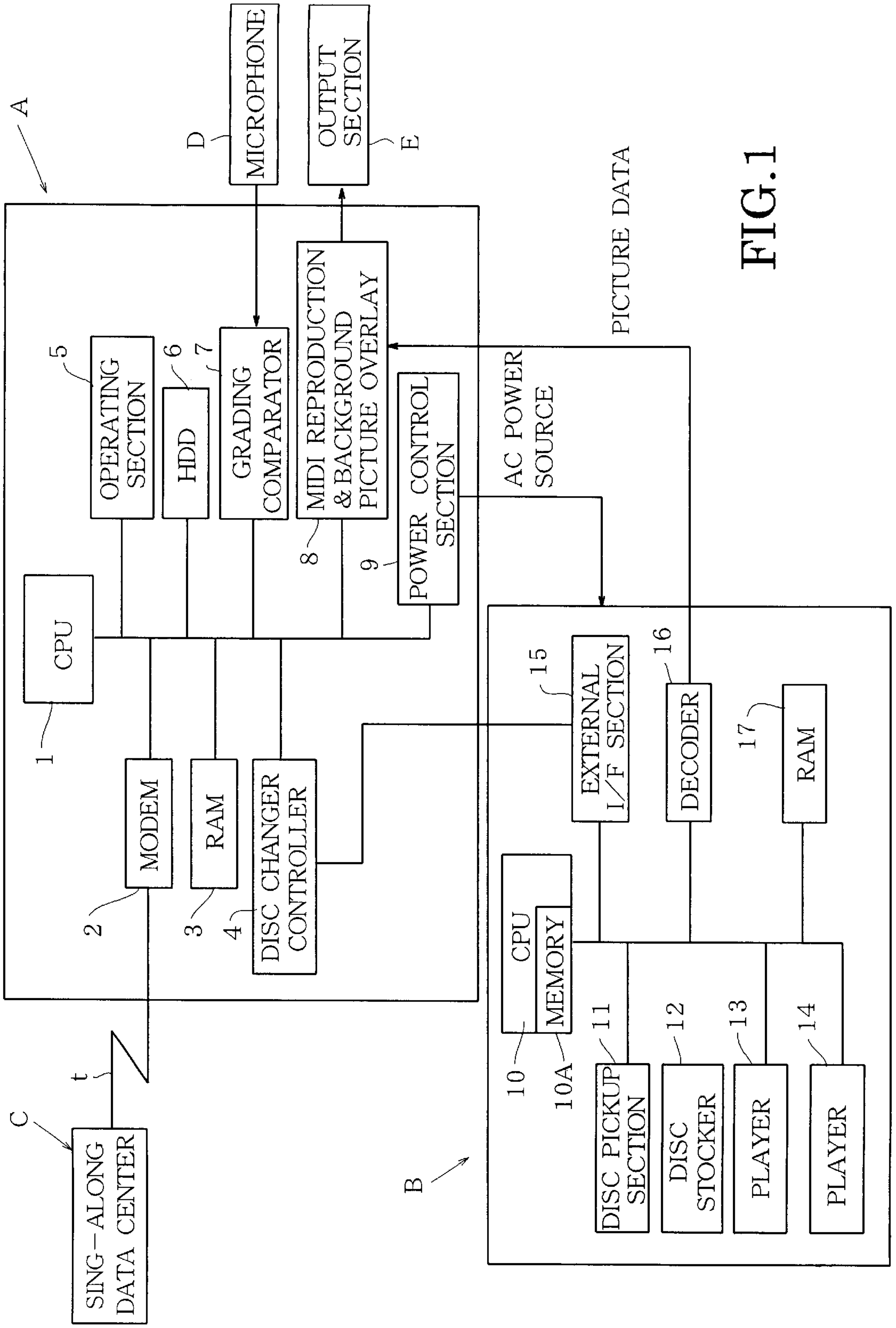
FIG. 1 is a block diagram schematically indicating an example in which the present invention has been applied to a communication type sing-along apparatus.

Referring to FIG. 1, a communication type sing-along apparatus made according to the present invention includes a controller A and a disc changer B.

The controller A includes a CPU (Central Processing Unit) 1, a modem 2, a RAM (Random Access Memory) 3, a changer controller 4, an operating section 5, a HDD (Hard Disc Drive) 6, a grading comparator 7, an MIDI (Music Instrument Digital Interface) reproducing & background overlay section 8, and an electric power controller 9.

The disc changer B includes a CPU 10, a disc pickup (transporting ) section 11, a disc stocker 12, players 3 and 14, an external I/F section (SCSI) 15, a decoder 16, and a RAM 17.

As shown in FIG. 1, the CPU 10 contains a memory 10A storing an application software for operating the disc changer B.

Since the modem 2 is connected to a host computer in a sing-along data center C via a telephone line t, the communication type sing-along apparatus is enabled to download sing-along music data transmitted from the sing-along data center C. Here, the sing-along music data includes MIDI data for reproducing an accompaniment music, background picture selection data for selecting background picture, character data for indicating song words.

The sing-along music data downloaded from the sing-along data center C through the modem 2, is at first recorded in the HDD 6 . When a user operates the operating section 5 to select a desired song and a corresponding background picture, the selected sing-along music data may be easily read out from the HDD 6, and the n be demodulated into audio signal of accompaniment music by virtue of the MIDI reproducing & background overlay section 8. Further, the audio signal is mixed with the sound signal transmitted through a grading comparator 7 from a microphone D connected with the controller A, so as to be outputted through a speaker of an output section E including a monitor (not shown) and a speaker (now shown).

At this time, if the controller A is set to be in a grading mode by operating the operating section 5, the grading comparator 7 will perform a comparison between one kind of data (indicating a musical interval and a timing of a melody, forming a standard value for singing a song) and a sound inputted through the microphone D, thereby performing a grading process to evaluate (grade) the performance of a singer, with the grading results being outputted to the output section E and indicated on the monitor.

The electric power controller 9 is provided to control a power supply to the disc changer B, so that when a main power source (not shown) of the controller A is turned ON, the disc changer B will also be turned ON by virtue of an interlock arrangement.

The RAM 3 is provided to temporarily store a kind of quality data transmitted from the RAM 17 of the disc changer B, such quality data is used to indicate an operation quality of the disc changer B.

Various controlling operations performed by the controller A are all controlled by the CPU 1.

The disc changer B is adapted to stock CD-ROMs storing music data and DVDs storing background picture data, and to optionally pickup a selected CD-ROM and a selected DVD, thereby reading out desired music data and desired background picture data, both of which are then outputted to the controller A.

Since there is a limit in the memory capacity of the HDD 6, some sing-along music data prepared in and transmitted from the sing-along data center C may be stored in the CD-ROMs of the disc changer B. In this way, if a music data corresponding to a melody selected by a user has been stored in a CD-ROM, such music data may be read out from the CD-ROM, thus enabling a desired reproduction of the selected melody.

When a user has selected a melody stored in a CD-ROM stocked in the disc stocker 12 of the disc changer B, the CPU 1 will cause the changer controller 4 to produce a selection signal through the external I/F section 15, so that the selection signal may be input into the disc changer B. At this time, the disc changer B will be operated in accordance with the selection signal, such that the pickup section 14 can operate to pickup a desired CD-ROM and a desired DVD from the stocker 12. The picked CD-ROM and DVD are then set in the players 13 and 14 respectively, thereby effecting a desired reading of the music data from the selected CD-ROM and a desired reading of the background picture data from the selected DVD.

The music data read from the selected CD-ROM are fed to the MIDI reproduction & background overlay section 8 through the external I/F section 15 and the changer controller 4. Meanwhile, the background picture data read from the selected DVD and in a compressed state are expended in the decoder 16 so as to be fed to the MIDI reproduction & background overlay section 8. In fact, the background picture data are combined with the images of song words reproduced from character data contained in the selected music data, thereby obtaining a combined signal to be fed to the monitor of the output section E.

The RAM 17 is provided to store quality data such as data concerning a reading error happened in a process of reading a CD-ROM and a DVD. In fact, such quality data occurs during the operation of the disc changer B.

There may be various error data obtainable by the decoder 16, such as error correction data for correcting an error contained in the data reproduced from a DVD, a sort of data indicating an abnormal error rate, and another sort of data indicating a reduced output of a reproduced signal from a player. Further, an error data may also be used to indicate an abnormal voltage, an abnormal current, an abnormal timing of a driving section and a servo system of each of the players 13 and 14.

Similarly, various controlling actions of the disc changer B are all controlled by the CPU 10 contained therein.

A data file which may be an application software necessary for performing the operation of the disc changer B is constantly transmitted from a host computer in a sing-along data center C via a telephone line t, and is written into the memory 10A contained in the CPU 10 so as to replace old data recorded therein. In this way, it is sure to update an application software stored in the memory 10A at any time.

Here, the memory 10 comprises a non-volatile memory such as a flash memory or a battery-backup RAM, so that even if the disc changer B is not connected with an electric power source, the data stored in the memory 10 can be constantly maintained in a desired manner.

A data file such as an application software for the operation of the disc changer B may be replaced by a new one in the following procedure.

Usually, a data file such as an application software is transmitted from a sing-along data center C to a communication type sing-along apparatus at night when not in a business time. Since the disc changer B is not connected with an electric power source at such a time period, it is impossible for a new data file transmitted from the sing-along data center C to be recorded in the memory 10 to replace an old data file.

Accordingly, the new data file transmitted from the sing-along data center C via a telephone line t is at first downloaded in the HHD 6 of the controller 6 whose power source is constantly set at a stand-by mode even at night when not in a business time.

Further, a new data file transmitted from the sing-along data center C via a telephone line t contains a clock information. In this way, a clock contained in the CPU 1 will perform a time adjustment in accordance with the clock information contained in the new data file.

Figure 2:
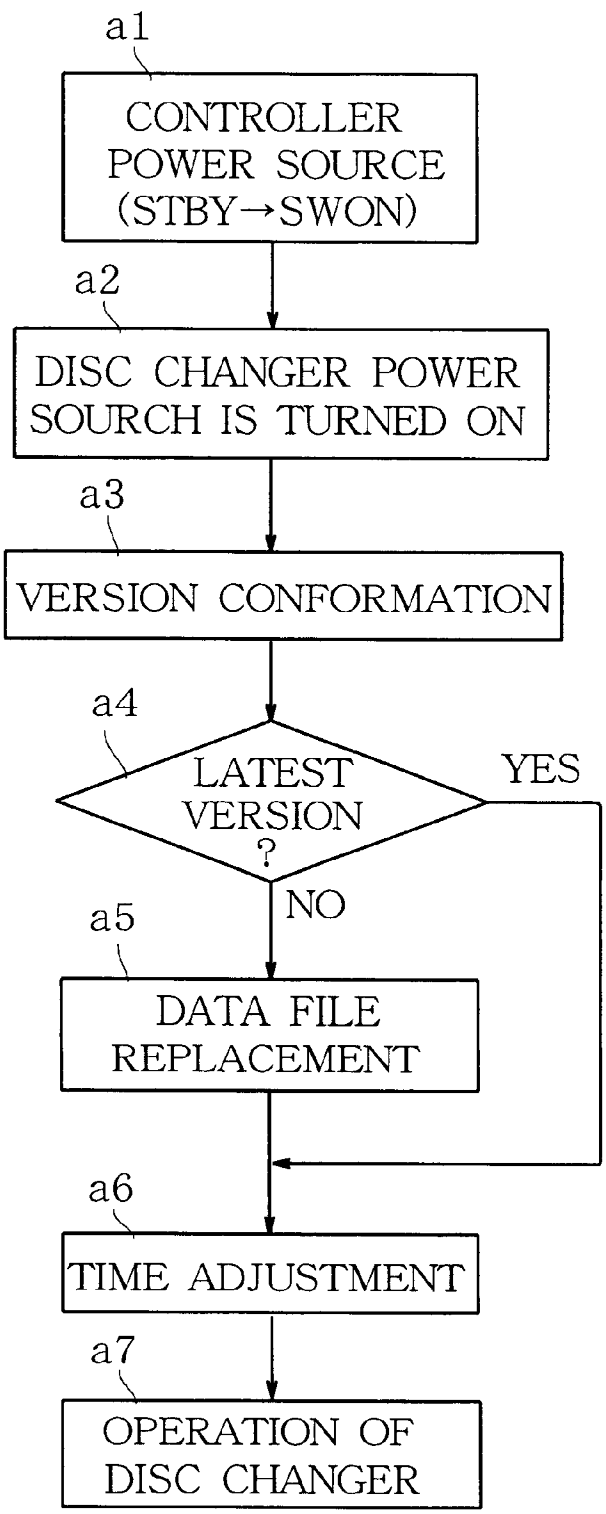
FIG. 2 is a flowchart indicating a procedure for replacing an old data file with a new one, according to the present invention.

FIG. 2 is a flowchart indicating a procedure where an old data file recorded in the memory 10 of the disc changer B is replaced by a new data file transmitted from a sing-along data center C and stored in the HDD 6.

As shown in FIG. 2, a main power source (not shown) of the controller A in a stand-by mode is turned ON (step al). Then, the power controlling section 9 of the controller A operates so that the disc changer B is also turned ON (step a2).

As soon as the disc changer B is turned ON in its electric power source, the CPU 10 of the disc changer B operates to confirm a version of the new data file transmitted from the sing-along data center C and downloaded on the HDD 6 of the controller A (step a3), thereby comparing the version of the new data file with the version of an old data file previously recorded in the memory 10A of the CPU 10 of the disc changer B (step a4).

At the step a4, if it is determined that the version of the data file stored in the HDD 6 of the controller A is newer than the version of an old data file formerly recorded in the memory 10A of the disc changer B, the data file stored in the HDD 6 will be written into the memory 10A so as to replace the old data file formerly recorded therein (step a5).

On the other hand, at the step a4, if it is determined that the version of the data file stored in the HDD 6 of the controller A is older than the version of a data file formerly recorded in the memory 10A of the disc changer B, the data file stored in the HDD 6 will not be written into the memory 10A so as not to replace the data file formerly recorded in the memory 10A.

Then, the CPU 1 of the controller A operates to produce a time information from a clock contained therein to the disc changer B (step a6), so that the CPU 10 of the disc changer B will perform a time adjustment of a clock contained therein in accordance with the time information produced from the controller A.

The clock of the CPU 1 of the controller A is constantly corrected in accordance with the time information contained in a new data file transmitted from the sing-along data center C. Thus, the clock of the CPU 10 of the disc changer B is also constantly corrected in accordance with the time information produced from the CPU 1. Therefore, during the operation of the disc changer B, the disc changer B may be under a correct time system, thereby making it sure to correctly record a time at which an operation error occurs in the disc changer B.

After the time adjustment on the clock of the CPU 10, the disc changer B is allowed to start its operation in accordance with the latest data file newly stored in the memory 10A of the disc changer (step a7).

Here, at the step a5, after the old data file formerly recorded in the memory 10A of the disc changer B has been replaced by a new data file stored in the HDD 6 of the controller A, it is allowed to erase the new data file recorded in the HDD 6. On the other hand, the new data file may also be allowed not to be erased from the HDD 6. By keeping the new data file in the HDD 6 of the controller A, said new data file may be written into the memory 10 of a new disc changer B newly connected with the controller A to replace a former disc changer B for the maintenance purpose. In this way, the newly connected disc changer B is allowed to perform predetermined operations in accordance with the new date file, without having to download a new data file from the sing-along data center C.

A procedure for processing error data (which is a quality data indicating an operation quality of the disc changer B) obtained during the operation of the disc changer B will be described in detail below.

The error data possibly occurring during the operation of the disc changer B, may be a sort of data concerning a reading error when music data and background picture data are being read from a CD-ROM and a DVD. Such error data are then stored in the RAM 17 together with the clock data produced by the clock of the CPU 10.

Figure 3:
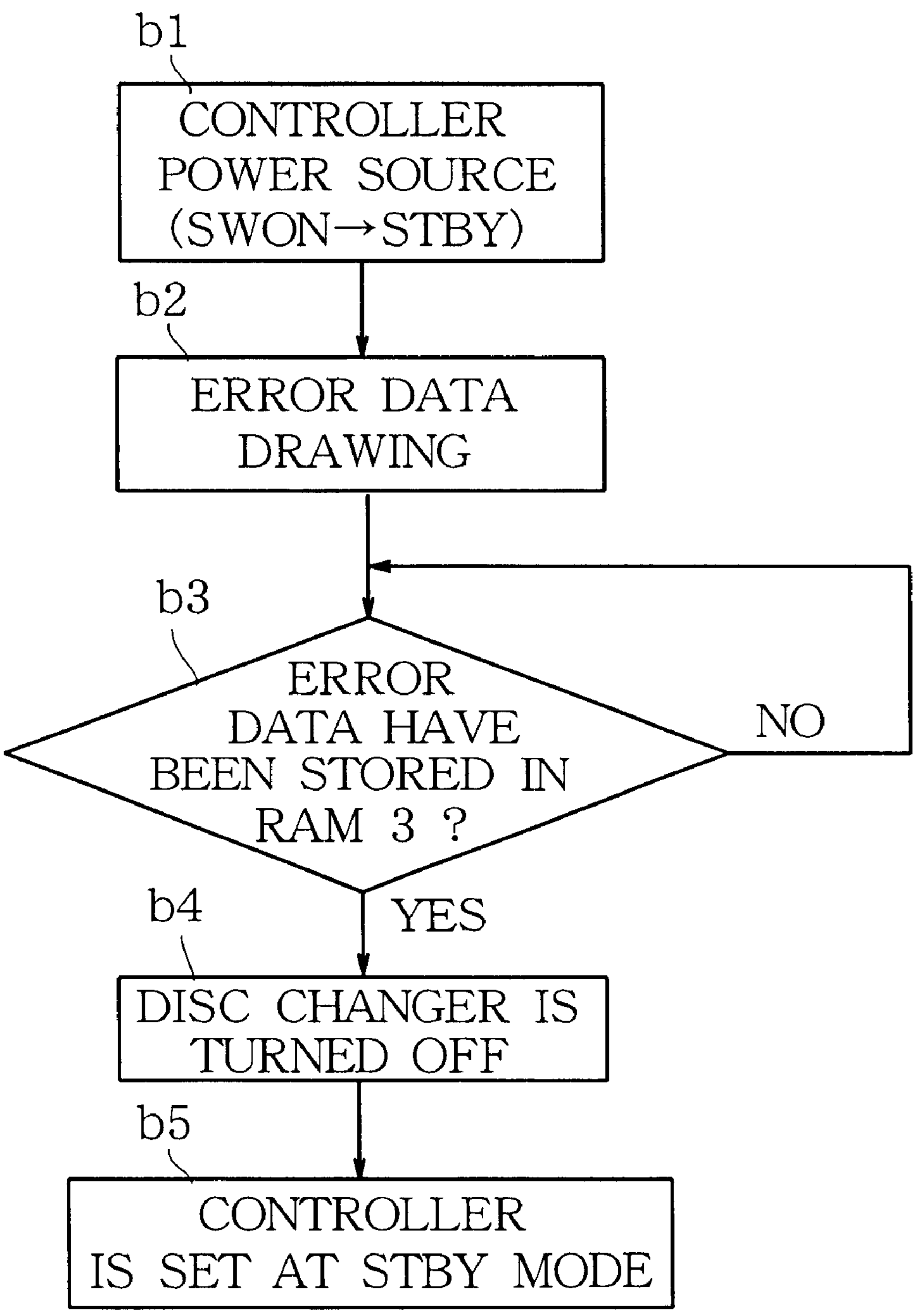
FIG. 3 is a flowchart indicating a procedure for treating error data, according to the present invention.

FIG. 3 is a flowchart indicating a procedure for treating the error data, by drawing said error data from the RAM 17 of the disc changer B to the controller A.

As shown in FIG. 3, at first, the controller A is turned from an ON state to a STAND-BY state so as to terminate the operation of the sing-along apparatus (at a step b1). Then, the CPU 1 of the controller A operates to send a command to the CPU 10 of the disc changer B, orderring that error data recorded in the RAM 17 of the disc changer B be sent to the controller A (at a step b2), thereby actually effecting a transmission of the error data from the RAM 17 to the RAM 3.

Subsequently, at a step b3, it is determined whether or not the error data from the RAM 17 of the disc changer B has been completely stored in the RAM 3 of the controller A. If it is determined that the error data from the RAM 17 of the disc changer B has been completely stored in the RAM 3 of the controller A, the power control section 9 of the controller A operates to turn off the power source of the disc changer B (at a step b4). On the other hand, if it is determined that the error data from the RAM 17 of the disc changer B has not been completely stored in the RAM 3 of the controller A, the storing process is continued until said storing process is completed.

Then, the electric power source of the controller A is set at the STAND-BY mode (at a step b5).

In fact, the error data (indicating errors occurred during the operation of the disc changer B) stored in the RAM 3 of the controller A is allowed to be transmitted to the sing-along data center C when a new data file is transmitted from the center C to the sing-along apparatus (by virtue of two-way communication system).

Namely, during a time period when the disc changer B is in an electrically OFF state because the sing-along apparatus is not in a time of its business use, if a data file is transmitted from the sing-along data center C, the controller A in its STAND-BY mode can store the new data file transmitted via the telephone line t in the HDD 6, while the error data stored in the RAM 3 of the controller A is allowed to be transmitted to the data center C via the same telephone line t.

In this way, since the error data recorded during the operation of the sing-along apparatus can be transmitted to the sing-along data center C when the sing-along apparatus is not in its operation for business use, it is sure for the sing-along data center C to exactly obtain valuable quality information about the disc changer B of the sing-along apparatus, thereby ensuring that an appropriate maintenance of the disc changer B may be conducted at an earlier time.

Further, at the time when the error data of the disc changer B is transmitted to the sing-along data center C, some quality information about the controller A may also be transmitted to the sing-along data center C, thereby ensuring that an appropriate maintenance of the controller A may also be conducted at an earlier time.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A method of processing communication data transmitted from a data supply source to a terminal communication apparatus via a communication line, said method comprising the steps of:

storing a data file in a first memory means provided in the terminal communication apparatus when said data file has been transmitted from the data supply source while the terminal communications apparatus itself is not in operation;

comparing a version of the data file stored in the first memory means with a version of an existing data file formerly recorded in a second memory means provided in the terminal communication apparatus when said terminal communication apparatus is in operation and said second memory means is in an ON state;

replacing the data file formerly recorded in the second memory means with the data file recorded in the first memory means if it is determined that the version of the data file recorded in the second memory means is older than the version of the data file recorded in the first memory means.

2. The method according to claim 1, wherein the data file recorded in the first memory means is not erased even after the data file formerly recorded in the second memory means is replaced by the data file recorded in the first memory means.

3. The method according to claim 1, wherein quality data indicating an operation quality of the terminal communication apparatus is recorded on a third memory means which is in OFF state when said terminal communication apparatus is not in operation, the quality data recorded on the third memory means is then stored in a fourth memory means before the third memory means is turned OFF.

4. The method according to claim 3, wherein when a data file is transmitted from the data center to the terminal communication apparatus, the quality data stored in the fourth memory means is transmitted to the data center via the communication line.

5. The method according to claim 1, wherein said terminal communication apparatus includes a controller having said first memory means and a disc changer having s aid second memory means;

wherein when the disc changer is in OFF state and a data file for use in the disc changer is transmitted from the data center to the terminal communication apparatus, the transmitted data file is at first stored in the first memory means provided within the controller.

6. An apparatus capable of processing communication data transmitted from a data supply source via a communication line, said apparatus comprising:

a first memory means for storing a data file transmitted from the data supply source when said apparatus is not in operation;

a second memory means which is turned OFF when said apparatus is not in operation;

a comparator means for comparing a version of the data file stored in the first memory means with a version of an existing data file formerly recorded in the second memory means when the second memory means is in an ON state;

a controller means for replacing the data file formerly recorded in the second memory means with the data file recorded in the first memory means if it is determined by the comparator means that the version of the data file recorded in the second memory means is older than the version of the data file recorded in the first memory means.

7. The apparatus according to claim 6, wherein said apparatus further comprising:

a third memory means which is adapted to record quality data indicating an operation quality of said apparatus and is turned OFF when said apparatus is not in its operation;

a fourth memory means which is adapted to receive and store the quality data fed from the third memory means;

wherein the controller means is adapted to operate such that when said apparatus is in its operation, the quality data recorded on the third memory means is fed to and stored in the fourth memory means before the third memory means is turned OFF, and that when a data file is transmitted from the data center to said apparatus, the quality data stored in the fourth memory means is transmitted to the data center via the communication line.

8. The apparatus according to claim 6, wherein said apparatus includes a controller having said first memory means and a disc changer having said second memory means;

wherein said controller means operates such that when the disc changer is in OFF state and a data file for use in the disc changer is transmitted from the data center to said apparatus, the transmitted data file is at first stored in the first memory means provided within the controller.

9. A method according to claim 1 wherein the data supply source is a data center.

10. An apparatus according to claim 6 wherein the data supply source is a data center.

* * * * *